US012801080B2

(12) United States Patent
Shimodaira et al.

(10) Patent No.: US 12,801,080 B2
(45) Date of Patent: Nov. 17, 2026

(54) CLEANING DEVICE HAVING TRANSPORT MEMBER WITH NON-TRANSPORT PORTION, REMOVABLE UNIT, AND IMAGE FORMING APPARATUS

(71) Applicant: FUJIFILM Business Innovation Corp., Tokyo (JP)

(72) Inventors: Akira Shimodaira, Kanagawa (JP); Yukihiro Ichiki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/513,054

(22) Filed: Nov. 17, 2023

(65) Prior Publication Data

US 2024/0103427 A1 Mar. 28, 2024

Related U.S. Application Data

(63) Continuation of application No. 18/095,568, filed on Jan. 11, 2023, now abandoned.

(30) Foreign Application Priority Data

Sep. 28, 2022 (JP) ................................ 2022-155020

(51) Int. Cl.
*G03G 21/12* (2006.01)

(52) U.S. Cl.
CPC ..... *G03G 21/12* (2013.01); *G03G 2221/1624* (2013.01)

(58) Field of Classification Search
CPC ....................... G03G 21/12; G03G 2221/1624
See application file for complete search history.

(56) References Cited

U.S. PATENT DOCUMENTS 4,297,021 A * 10/1981 Tani .................... G03G 21/105 222/413
7,447,467 B2 11/2008 Kamimura et al.
(Continued)

FOREIGN PATENT DOCUMENTS

JP 61-163364 A 7/1986
JP 2005-173351 A 6/2005
(Continued)

OTHER PUBLICATIONS

Communication dated Jul. 14, 2026, issued in Japanese Application No. 2022-155020.

*Primary Examiner* — Walter L Lindsay, Jr.
*Assistant Examiner* — Milton Gonzalez
(74) *Attorney, Agent, or Firm* — Sughrue Mion, PLLC

(57) ABSTRACT

A cleaning device includes: a plate-like cleaning member that cleans a cleaning target surface, which is moved with toner attached to the cleaning target surface, of a cleaning target body by scraping the toner with a part of a distal end surface of the cleaning member contacting the cleaning target surface; a body that has a storage space that stores waste toner that has fallen after being scraped by the cleaning member; and a transport member disposed in the storage space of the body at a position below the distal end surface of the cleaning member to transport the waste toner stored in the storage space along a longitudinal direction of the cleaning member. The transport member includes a non-transport portion that exerts no transport force in a direction along the longitudinal direction of the cleaning member.

20 Claims, 12 Drawing Sheets

(56) References Cited

U.S. PATENT DOCUMENTS

| | | | | |
|---|---|---|---|---|
| 7,623,820 | B2 | 11/2009 | Nada et al. | |
| 8,081,918 | B2 * | 12/2011 | Suzuki | G03G 15/0844 399/256 |
| 8,971,785 | B2 * | 3/2015 | Nakajima | G03G 21/12 399/358 |
| 2023/0367256 | A1 * | 11/2023 | Saito | G03G 21/12 |

FOREIGN PATENT DOCUMENTS

| | | | |
|---|---|---|---|
| JP | 2007-225742 | A | 9/2007 |
| JP | 2011-191408 | A | 9/2011 |
| JP | 2011-248167 | A | 12/2011 |
| JP | 2012-226124 | A | 11/2012 |
| JP | 2015-28611 | A | 2/2015 |

* cited by examiner

CLEANING DEVICE HAVING TRANSPORT MEMBER WITH NON-TRANSPORT PORTION, REMOVABLE UNIT, AND IMAGE FORMING APPARATUS

CROSS-REFERENCE TO RELATED APPLICATIONS

This application is a Continuation of U.S. application Ser. No. 18/095,568, filed on Jan. 11, 2023, which is based on and claims priority under 35 USC 119 from Japanese Patent Application No. 2022-155020 filed Sep. 28, 2022, the contents of all of which are incorporated herein by reference in their entireties.

BACKGROUND

(i) Technical Field

The present disclosure relates to a cleaning device, a removable unit, and an image forming apparatus.

(ii) Related Art

Japanese Unexamined Patent Application Publication No. 2005-173351 (claim 1 and FIG. 1) describes a cleaning device including a cleaning member that abuts against a surface of a cleaning target member and relatively moves on the surface to remove attached matter, and a collection container that has an opening that faces the cleaning target member on the side upstream of the cleaning member in order to collect the attached matter removed by the cleaning member in the vicinity of the cleaning member, in which a powder supply unit that supplies powder onto the cleaning target member is provided in the collection container.

Japanese Unexamined Patent Application Publication No. 2011-248167 (claims 1 and 2 and FIG. 2) describes an image forming apparatus in which untransferred toner that remains on an intermediate transfer belt is removed by a cleaning blade in press contact with the intermediate transfer belt, the image forming apparatus including a waste toner supply unit that scatters waste toner removed and collected from the intermediate transfer belt by the cleaning blade onto a portion of the intermediate transfer belt between a second transfer region and the cleaning blade.

Japanese Unexamined Patent Application Publication No. 2011-248167 (claims 1 and 2 and FIG. 2) also indicates that the image forming apparatus further includes a toner transport unit that transports waste toner removed and collected from the intermediate transfer belt by the cleaning blade to the waste toner supply unit.

SUMMARY

Aspects of non-limiting embodiments of the present disclosure relate to providing a cleaning device, a removable unit, and an image forming apparatus that suppress curling of a distal-end portion of a plate-like cleaning member, a part of a distal end surface of which contacts a cleaning target surface, which is moved with toner attached thereto, of a cleaning target body, compared to the case where a transport member that includes a non-transport portion is not adopted.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a cleaning device including: a plate-like cleaning member that cleans a cleaning target surface, which is moved with toner attached thereto, of a cleaning target body by scraping the toner with a part of a distal end surface of the cleaning member contacting the cleaning target surface; a body that has a storage space that stores waste toner that has fallen after being scraped by the cleaning member; and a transport member disposed in the storage space of the body at a position below the distal end surface of the cleaning member to transport the waste toner stored in the storage space along a longitudinal direction of the cleaning member, in which the transport member includes a non-transport portion that exerts no transport force in a direction along the longitudinal direction of the cleaning member.

BRIEF DESCRIPTION OF THE DRAWINGS

Exemplary embodiments of the present disclosure will be described in detail based on the following figures, wherein:

FIG. 3 illustrates the configuration of a transport member etc. of the cleaning device in

FIG. 1;

DETAILED DESCRIPTION

Exemplary embodiments of the present disclosure will be described below.

First Exemplary Embodiment

A cleaning device 1, an image forming apparatus 3, and a removable unit 7 according to a first exemplary embodiment are configured as described below.

Cleaning Device

Figure 1:
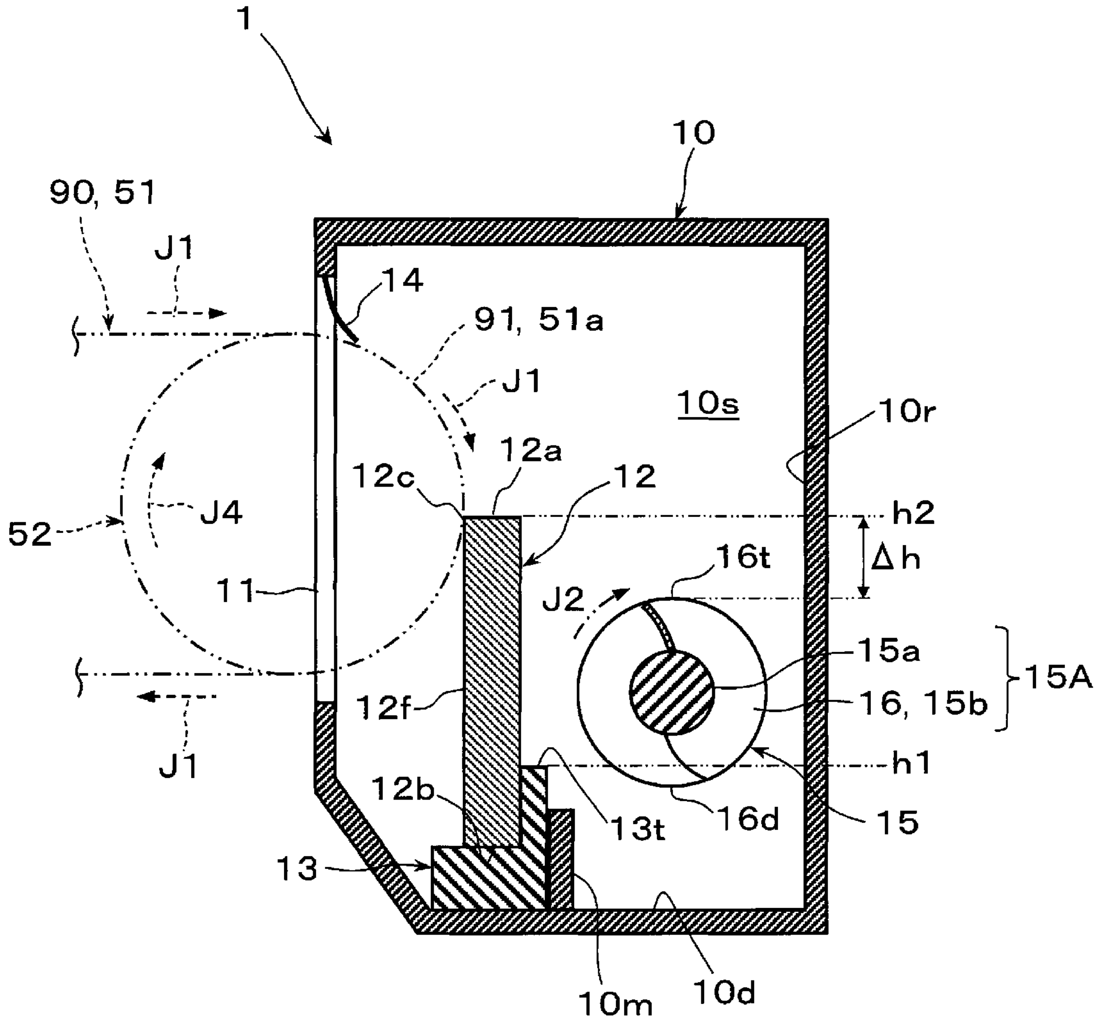
FIG. 1 is a schematic perspective view of a cleaning device according to a first exemplary embodiment.

As illustrated in FIG. 1, the cleaning device 1 is a device that cleans a cleaning target surface 91 of a cleaning target body 90, which is moved with toner attached thereto, by removing unwanted matter such as unnecessary toner located on the cleaning target surface 91.

The unwanted matter is matter to be removed from the cleaning target surface 91. The unnecessary toner is toner to be removed from the cleaning target surface 91.

As illustrated in FIG. 1, the cleaning device 1 according to the first exemplary embodiment includes a body 10, and a plate-like cleaning member 12, a holding member 13, a transport member 15, etc. disposed inside the body 10.

The body 10 has an internal storage space 10*s* that stores waste toner etc. scraped by the cleaning member 12 and that stores the cleaning member 12, the holding member 13, the transport member 15, etc. disposed therein, and a cleaning opening portion 11 provided to face the cleaning target surface 91 of the cleaning target body 90.

The body 10 also includes a seal material 14 provided at the cleaning opening portion 11 to prevent leakage of waste toner. The seal material 14 may be a member such as a film.

The plate-like cleaning member 12 is a plate-like member that cleans the cleaning target surface 91 of the cleaning target body 90 by scraping unwanted matter such as unnecessary toner located on the cleaning target surface 91 by causing a part 12*m* (see FIG. 4A) of a distal end surface 12*a* of the cleaning member 12 to contact the cleaning target surface 91. The cleaning member 12 is also referred to as a "cleaning blade".

Figure 2:
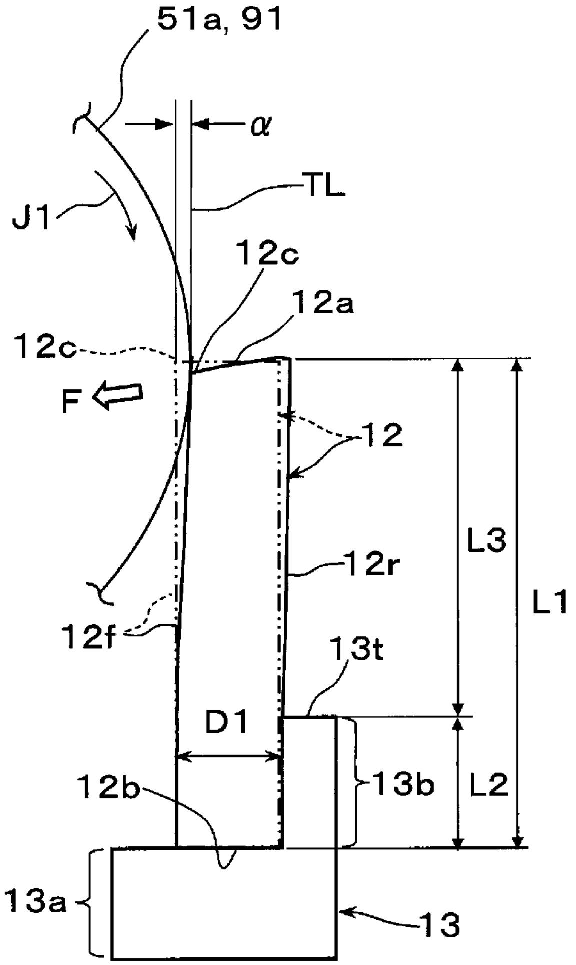
FIG. 2 illustrates the configuration of a cleaning member, a holding member, etc. of the cleaning device in FIG. 1.

As illustrated in FIG. 2, the cleaning member 12 according to the first exemplary embodiment is a plate member that has a horizontally long rectangular surface and a prescribed plate thickness D1, the surface having a prescribed length L1 and a width and extending in a direction that is substantially orthogonal to a direction (moving direction) J1 of movement of the cleaning target surface 91.

The cleaning member 12 is used with a corner portion 12*c* of the distal end surface 12*a* contacting the cleaning target surface 91 along a direction that is substantially orthogonal to the moving direction J1 of the cleaning target surface 91. As illustrated in FIG. 1, the corner portion 12*c* of the distal end surface 12*a* is a portion at a side at which a belly surface 12*f* of the cleaning member 12 and the distal end surface 12*a* intersect each other, the belly surface 12*f* facing a portion of the cleaning target surface 91 on the downstream side in the moving direction J1 during cleaning.

The cleaning member 12 may be an elastic plate constituted of a material such as polyurethane, silicon rubber, or butadiene rubber, for example.

The length L1 is the dimension of the cleaning member 12 as measured substantially along the moving direction J1. The width is the dimension of the cleaning member 12 as measured along a direction that is substantially orthogonal to the moving direction J1, and is greater than the length L1. Therefore, the direction of the width of the cleaning member 12 corresponds to a longitudinal direction E (see FIG. 3). The state of being "substantially orthogonal" indicates an intersecting state in which the angle of intersecting the moving direction J1 is the right angle (90°) or in a range within ±3° from the right angle.

The holding member 13 is a member that holds the cleaning member 12 inside the body 10 such that the corner portion 12*c* of the distal end surface 12*a* contacts the cleaning target surface 91.

The holding member 13 according to the first exemplary embodiment may be a member shaped to have a holding portion that holds the cleaning member 12 attached thereto.

Specifically, as illustrated in FIG. 2, the holding member 13 is composed of a rectangular column foundation portion 13*a* that has been laid and a plate-like rising portion 13*b* that rises perpendicularly to a prescribed height at a rear position on the upper surface of the foundation portion 13*a*, the upper surface of the foundation portion 13*a* and the front surface of the rising portion 13*b*, which are substantially orthogonal to each other, forming a holding portion constituted of the two surfaces. In other words, the holding member 13 is shaped to have a holding portion constituted of two substantially orthogonal surfaces formed by removing a rectangular column portion, including one corner portion, from a rectangular column.

As illustrated in FIG. 1, the foundation portion 13*a* of the holding member 13 is directly fixed to a bottom surface 10*d* of the storage space 10*s* inside the body 10. The holding member 13 may be fixed to the bottom surface 10*d* of the body 10 via an attachment portion. Reference sign 10*m* in FIG. 1 denotes a positioning portion that positions a part of the holding member 13 (the back surface of the foundation portion 13*a* and a lower portion of the back surface of the rising portion 13*b*).

The holding member 13 may be formed from a material such as metal, for example.

As illustrated in FIG. 2, the holding member 13 holds the cleaning member 12 with a rear end surface 12*b* of the cleaning member 12 pressed against the upper surface of the foundation portion 13*a* and with a back surface 12*r* of a portion of the cleaning member 12 on the rear end side for a prescribed length L2 pressed against the front surface of the rising portion 13*b*. Consequently, the cleaning member 12 is used as held with a portion of the cleaning member 12 on the distal end side for a length L3, which is obtained by subtracting the length L2 of the rear-end portion held by the holding member 13 from the overall length L1, left as a non-held portion (free portion) not held by the holding member 13.

As illustrated in FIG. 2, the holding member 13 holds the rear-end portion, with the length L2, of the cleaning member 12 such that the cleaning member 12 interferes with the cleaning target surface 91 with a prescribed amount of interference a and a prescribed pressing force F, for example.

In design, the amount of interference a of the cleaning member 12 is the amount (length) of interference of the corner portion 12*c* of the cleaning member 12 with the cleaning target surface 91 at the time when it is assumed that the cleaning member 12 is mounted at a prescribed contact angle with respect to the cleaning target surface and the distal-end portion of the cleaning member 12 is not elastically deformed to be warped (the state indicated by the double-dashed line in FIG. 2).

The amount of interference a is set in the range of 0.5 mm or more and 1.5 mm or less, for example. At this time, the contact angle is an angle (acute angle) in the range of 15° or more and 35° or less.

The pressing force F of the cleaning member 12 is the force with which the cleaning member 12 (corner portion 12*c*) is pressed against the cleaning target surface 91. The pressing force F is set in the range of 0.5 gf/mm or more and 4.0 gf/mm or less (1.5 N or more and 12 N or less), for example.

The transport member 15 is a member that transports waste toner scraped by the cleaning member 12 and stored in the storage space 10*s* of the body 10 toward a prescribed transport destination.

As illustrated in FIG. 1, the transport member 15 is installed at a position in the storage space 10*s* between the cleaning member 12 and a back surface wall 10*r* of the body 10 and below the distal end surface 12*a* of the cleaning member 12. The transport member 15 transports waste toner to be fed to the outside of the body 10 and toward a collection container 35 (see FIG. 7) that collects waste toner, for example.

Figure 3:
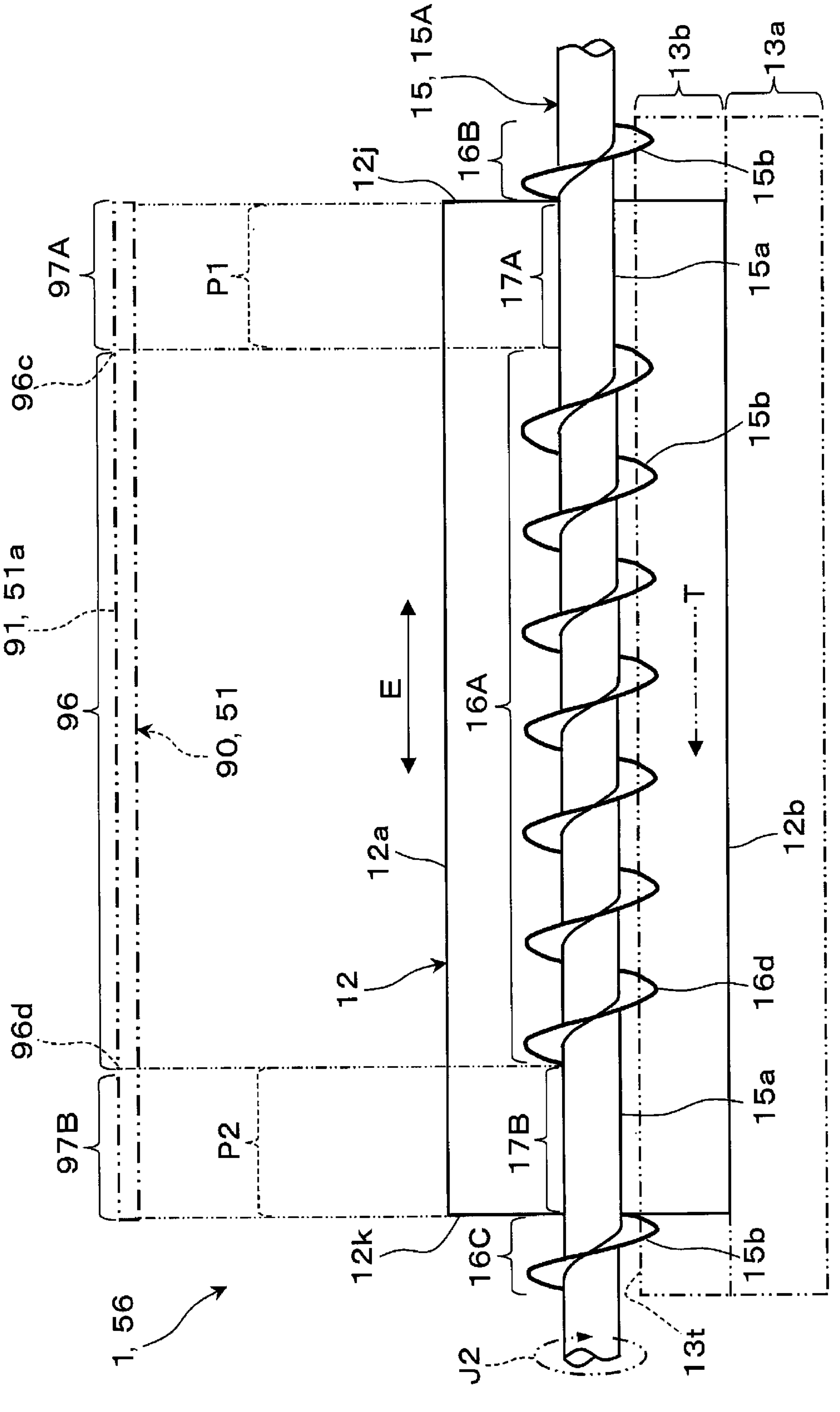

As illustrated in FIG. 3, the transport member 15 according to the first exemplary embodiment is constituted as a member that includes a transport portion 16 that exerts a transport force in a direction (transport direction T to be discussed later) along the longitudinal direction E of the cleaning member 12, and a non-transport portion 17 that exerts no transport force in a direction along the longitudinal direction E of the cleaning member 12.

As illustrated in FIG. 1, the transport member 15 may be an auger 15A composed of a rotary shaft 15*a* disposed along the longitudinal direction E (see FIG. 3) of the cleaning member 12 in the storage space 10*s* inside the body 10, and a transport blade 15*b* as an example of the transport portion 16 provided so as to be spirally wound around the outer peripheral surface of the rotary shaft 15*a*. The auger 15A is also referred to as a "screw auger".

The rotary shaft 15*a* of the auger 15A is rotatably supported in the storage space 10*s* of the body 10, and rotational power from a drive device (not illustrated) is transferred to one end portion of the rotary shaft 15*a*.

When the rotary shaft 15*a* is rotated in a prescribed rotational direction J2 as illustrated in FIGS. 1 and 3, the auger 15A transports waste toner in a desired transport direction T (see FIGS. 3 and 5) using the transport blade 15*b* as an example of the transport portion 16.

As illustrated in FIG. 3, the non-transport portion 17 of the auger 15A is constituted as two non-transport portions 17A, 17B provided at two positions P1, P2, respectively, in a range to include and face two end portions 12*j*, 12*k*, respectively, of the cleaning member 12 in the longitudinal direction E.

The two positions P1, P2 may be any position in a prescribed range that includes the two end portions 12*j*, 12*k*, respectively, of the cleaning member 12. Specifically, the two positions P1, P2 include a first position (P1) in a range from the end portion 12*j* on the upstream side in the transport direction T, of the two end portions 12*j*, 12*k* of the cleaning member 12, to a position a predetermined distance on the downstream side in the transport direction T, and a second position (P2) in a range from the end portion 12*k* on the downstream side in the transport direction T to a position a predetermined distance on the upstream side in the transport direction T.

As illustrated in FIG. 3, the non-transport portion 17 is constituted as a portion of the auger 15A at which the transport blade 15*b* which is spirally continuous is discontinuous and not provided, or in other words a portion at which the transport blade 15*b* is not provided. Therefore, no transport blade 15*b* but only the rotary shaft 15*a* is present at the non-transport portion 17.

As illustrated in FIG. 3, the auger 15A includes three transport portions 16A, 16B, 16C provided at positions upstream and downstream of the non-transport portions 17A, 17B in the transport direction T so as to interpose the non-transport portions 17A, 17B and composed of the transport blade 15*b* which exerts a transport force in a direction along the longitudinal direction E of the cleaning member 12.

Among these, the transport portion 16A is a principal transport portion provided in a wide area interposed between the two non-transport portions 17A, 17B. The transport portion 16B is the most upstream transport portion disposed at a position adjacently upstream of the non-transport portion 17A in the transport direction T. The transport portion 16C is the most downstream transport portion disposed at a position adjacently downstream of the non-transport portion 17A in the transport direction T.

As illustrated in FIG. 1, the auger 15A is disposed such that a lower end 16*d* of the transport blade 15*b* as an example of the transport portion 16 is located at a height position h1 below an upper end 13*t* of the rising portion 13*b* as a part of a portion of the holding member 13 that holds the cleaning member 12.

While it is only necessary that the lower end 16*d* of the transport blade 15*b* of the transport portion 16 should be located below the upper end 13*t* of the rising portion 13*b* of the holding member 13 at all in this case, the lower end 16*d* is preferably set such that at least a portion of the transport blade 15*b* for about one-sixth of the entire circumference of the outermost peripheral portion of the transport blade 15*b* is located below the upper end 13*t*.

As illustrated in FIG. 1, the auger 15A is disposed such that the upper end 16*t* of the transport blade 15*b* as an example of the transport portion 16 is located below the distal end surface 12*a* (height position h2) of the cleaning member 12.

The upper end 16*t* of the transport blade 15*b* is preferably set such that a height difference Δh (see FIG. 1) from the distal end surface 12*a* of the cleaning member 12 meets the following condition. That is, the height difference Δh is set so as to enable the highest portion of a waste toner mass (80Z; see FIG. 6), to be discussed later, caused by the non-transport portion 17 of the auger 15A of the transport member 15 to climb over the distal end surface 12*a* of the cleaning member 12.

When the cleaning device 1 described above is used, as illustrated in FIG. 1, the body 10 is disposed so as to enable the cleaning opening portion 11 to face the cleaning target surface 91 of the cleaning target body 90 to be cleaned. The cleaning device 1 is used with the plate-like cleaning member 12 disposed in contact with the cleaning target surface 91, which is located at the cleaning opening portion 11, in the state described above.

At this time, the cleaning member 12 is used in the state of being held by the holding member 13 in such a posture that the corner portion 12*c* of the distal end surface 12*a* first contacts the cleaning target surface 91 with the distal end surface 12*a* of the cleaning member 12 facing the cleaning target surface 91 in the moving direction J1, as illustrated in FIGS. 1 and 2.

The cleaning target body 90 to be cleaned by the cleaning device 1 may be any object that is moved with unnecessary toner to be removed attached thereto and that includes a cleaning target surface 91 to be effectively cleaned through contact with the cleaning member 12.

The toner is a material that constitutes a dry developer. The toner contains a body (principal body) in a fine particulate form and an external additive such as a lubricant that is finer than the body.

(Cleaning Operation of Cleaning Device)

When the cleaning device 1 is used, as illustrated in FIG. 1, the corner portion 12*c* of the distal end surface 12*a* of the plate-like cleaning member 12 is first placed in contact with the cleaning target surface 91 of the cleaning target body 90 which is moved in the moving direction J1.

Figure 4A:
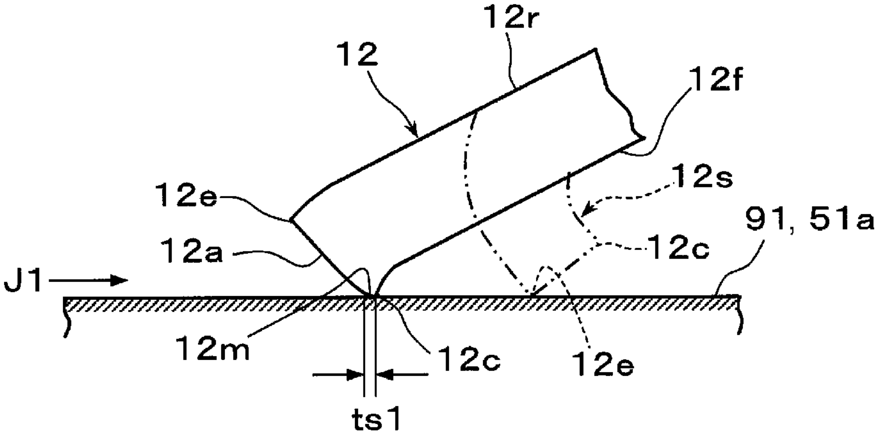
FIG. 4A schematically illustrates the state of contact of the cleaning member of the cleaning device during cleaning as enlarged.

In this event, as illustrated as enlarged in FIG. 4A, the part 12*m*, i.e. a portion that is close to the corner portion 12*c*, of the distal end surface 12*a* of the cleaning member 12 contacts the cleaning target surface 91 as elastically deformed in the state of being distorted so as to be drawn downstream in the moving direction J1 by a friction force (drawing force) generated through contact with the cleaning target surface 91 being moved.

Consequently, a portion that is close to the corner portion 12*c*, which is the part 12*m* of the distal end surface 12*a*, of the cleaning member 12 keeps in contact with the cleaning target surface 91 over a prescribed contact width ts1. The contact width ts1 is about 1 μm to 100 μm, for example.

The state in which the part 12*m* of the distal end surface 12*a* of the cleaning member 12 contacts the cleaning target surface 91 over the prescribed contact width ts1 corresponds to a state in which cleaning performance is secured. The part 12*m* of the distal end surface 12*a* of the cleaning member 12 returns to the original shape from the elastically deformed state when the cleaning target surface 91 is stopped and stationary.

Figure 4B:
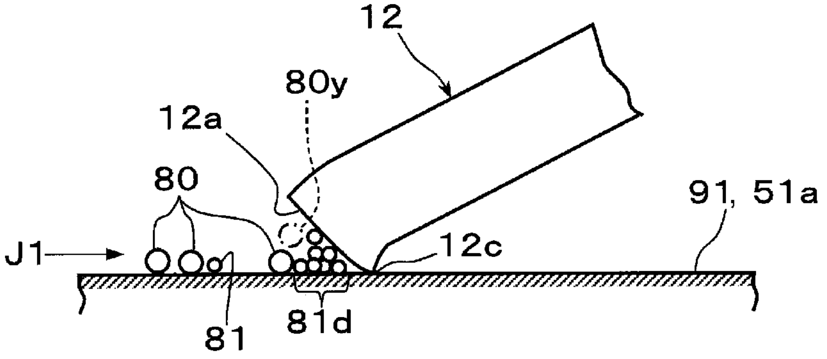
FIG. 4B schematically illustrates the state of cleaning by the cleaning member in FIG. 4A as enlarged.

As a result, as illustrated in FIG. 4B, unnecessary toner 80 attached to the cleaning target surface 91 is blocked and scraped by the distal end surface 12*a* of the cleaning member 12 in the cleaning device 1.

The toner 80 scraped by the cleaning member 12 falls in the storage space 10*s* of the body 10 to be stored as waste toner. Waste toner stored and deposited in the storage space 10*s* of the body 10 is transported in the transport direction T by the auger 15A as an example of the transport member 15.

In the cleaning device 1, as illustrated in FIG. 4B, an external additive 81 attached to the toner 80 is blocked by the distal end surface 12*a* of the cleaning member 12 to form an external additive mass 81*d* that resides so as to form a dam.

Consequently, in the cleaning device 1, the toner 80 blocked by the distal end surface 12*a* of the cleaning member 12 is inhibited from slipping through a gap between the cleaning member 12 and the cleaning target surface 91 by the external additive mass 81*d*.

In the cleaning device 1, a part of the external additive mass 81*d* is supplied to a gap between a portion (part 12*m*) of the distal end surface 12*a* of the cleaning member 12 that actually contacts the cleaning target surface 91 and the cleaning target surface 91 to function as a lubricant.

Consequently, in the cleaning device 1, the friction force between the cleaning member 12 and the cleaning target surface 91 is reduced, which suppresses an increase in the action of the part 12*m* of the distal end surface 12*a* of the cleaning member 12 being drawn downstream in the moving direction J1 by the cleaning target surface 91 being moved. As a result, a distal-end portion 12*s* including the distal end surface 12*a* of the cleaning member 12 is inhibited from being curled as indicated by the double-dashed line in FIG. 4A.

In the cleaning device 1, in the case where the amount of unnecessary toner located on the cleaning target surface 91 is relatively small (e.g. in the case where operation to form an image with a low image density, or in other words operation to form an image using a small amount of toner, is performed continuously), the amount of the external additive 81 is also small, which reduces the function as a lubricant, and therefore the distal-end portion 12*s* of the cleaning member 12 is occasionally curled as indicated by the double-dashed line in FIG. 4A.

The curl of the distal-end portion 12*s* of the cleaning member 12 is a phenomenon in which the distal-end portion 12*s* is elastically deformed to such a degree that a second corner portion 12*e* (a portion at a side at which the distal end surface 12*a* and the back surface 12*r* cross each other), which is opposite to the corner portion 12*c*, of the distal end surface 12*a* of the cleaning member 12 contacts the cleaning target surface 91 as indicated by the double-dashed line in FIG. 4A.

Figure 5:
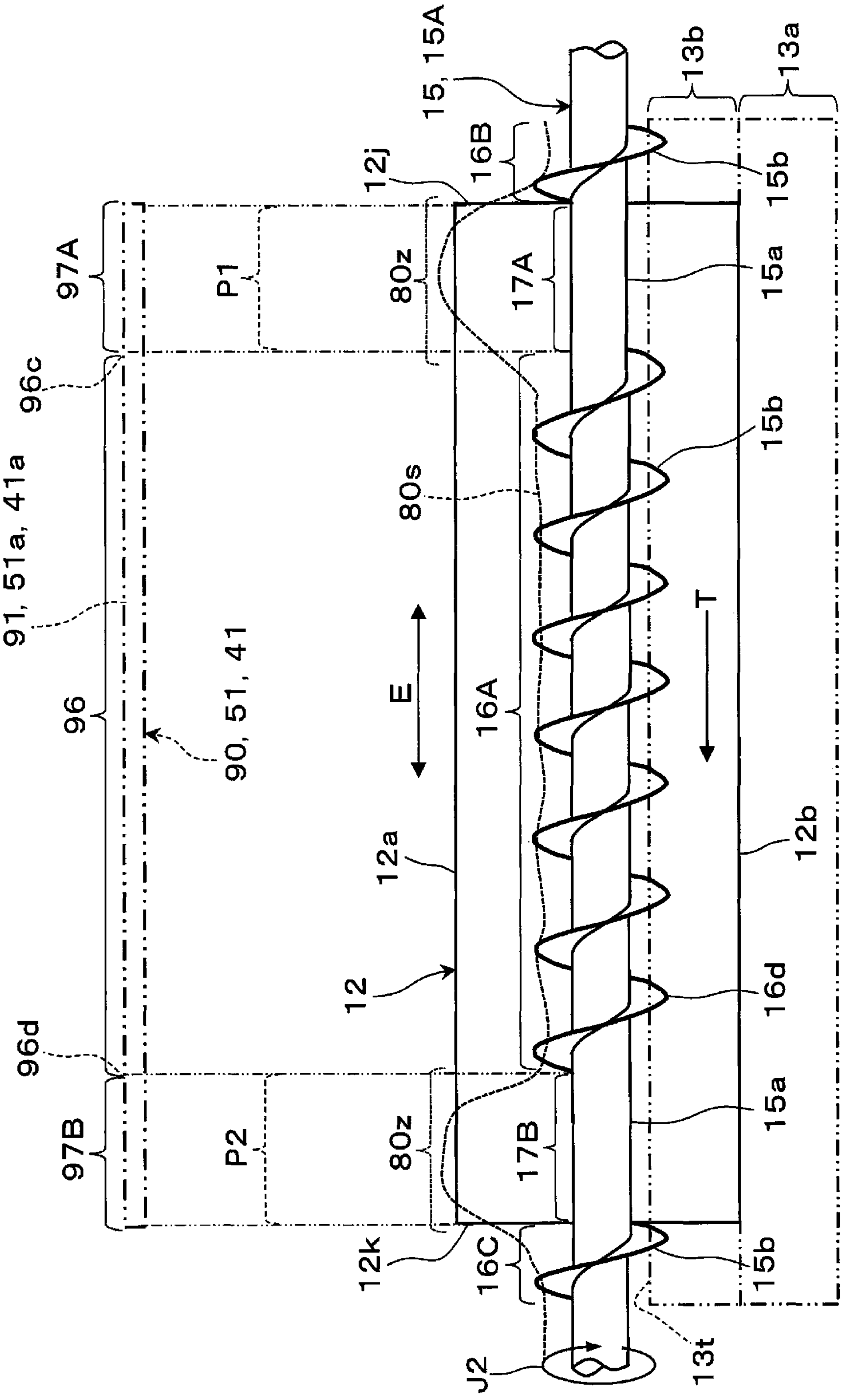
FIG. 5 illustrates the state of residence of waste toner in the cleaning device in FIG. 1.
Figure 6:
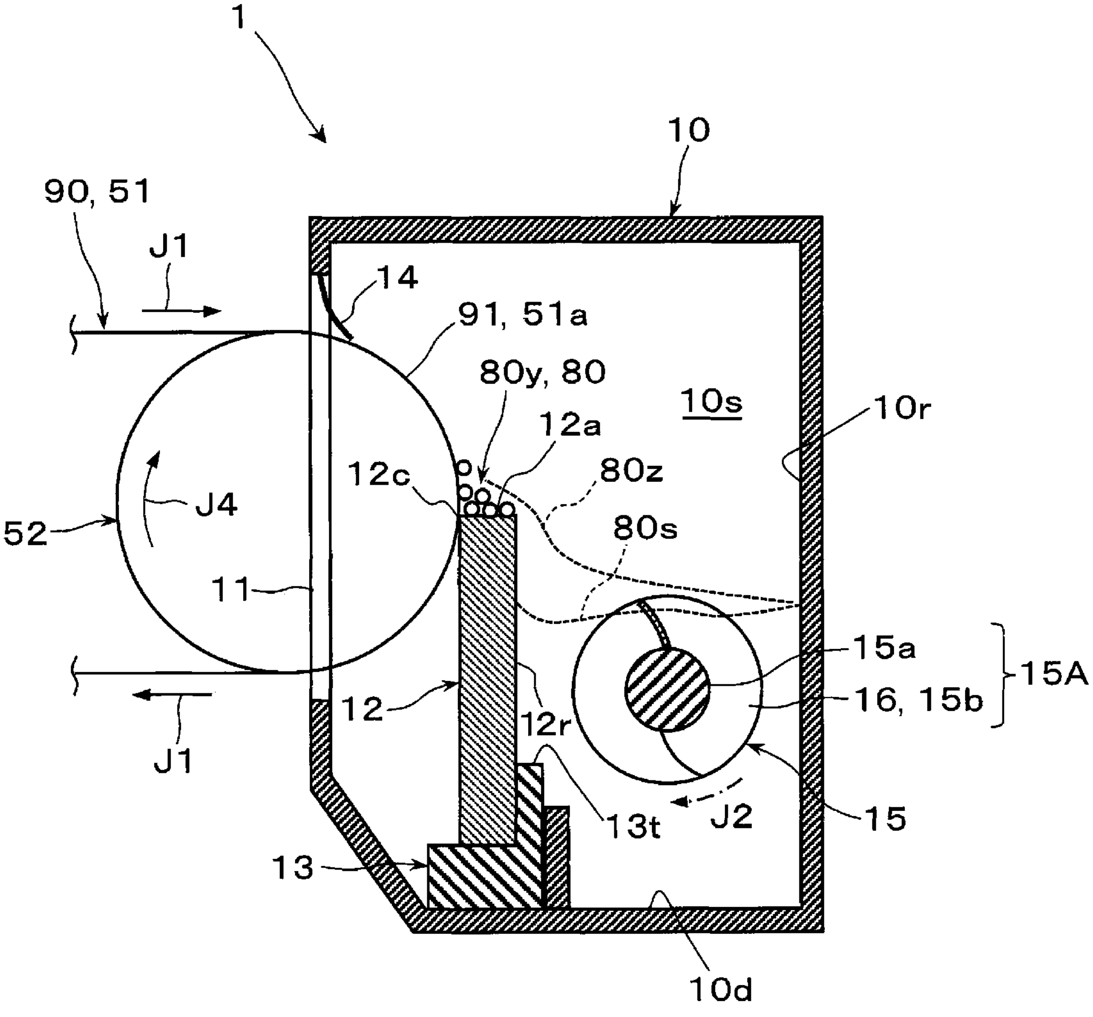
FIG. 6 illustrates the state of residence of waste toner in the cleaning device in FIG. 1 as seen from a different direction.

In this respect, the cleaning device 1 uses the auger 15A, which includes the non-transport portion 17, as an example of the transport member 15, and therefore a part of waste toner stored in the storage space 10*s* of the body 10 is not transported but temporarily resides in the storage space 10*s* because of the non-transport portion 17 (17A, 17B), as indicated by the broken line in FIGS. 5 and 6.

The broken line in the ranges denoted by reference sign 80*z* in FIGS. 5 and 6 indicates a surface (residence surface) of waste toner (groups) that resides under the influence of the non-transport portion 17 (17A, 17B) of the auger 15A exerting no transport force in the transport direction T. The broken line in the range denoted by reference sign 80*s* in FIGS. 5 and 6 indicates a surface (transport/movement surface) of waste toner (group) transported by the transport force in the transport direction T exerted by the transport blade 15*b* of the transport portion 16 (16A, 16B, 16C) of the auger 15A.

Consequently, as illustrated in FIG. 6, the waste toner 80*z* that resides in the range in which the non-transport portion 17 (17A, 17B) of the auger 15A is located is deposited to reach the distal end surface 12*a* as the upper end of the cleaning member 12 in the cleaning device 1, and a part 80*y* of the residing waste toner 80*z* is placed on the distal end surface 12*a*. That is, in the cleaning device 1, a part (80*y*) of waste toner stored in the storage space 10*s* of the body 10 is supplied so as to be returned to the distal end surface 12*a* of the cleaning member 12. The part 80*y* of waste toner supplied to the distal end surface 12*a* of the cleaning member 12 is spread little by little in the longitudinal direction E of the cleaning member 12.

As a result, as illustrated in FIGS. 4B and 6, the part 80*y* (waste toner) of the residing waste toner 80*z* is supplied to keep present in a gap between the distal end surface 12*a* of the cleaning member 12 and the cleaning target surface 91, besides the toner 80 to be scraped from the cleaning target surface 91, in the cleaning device 1, and thus a certain amount or more of the external additive 81 is also present with the addition of the external additive 81 contained in the part 80*y* of the waste toner 80*z*.

The amount of the waste toner 80*z* residing at the non-transport portion 17 (17A, 17B) of the auger 15A does not keep increasing, and the waste toner 80*z* is transported by being sequentially scraped by the transport blade 15*b* of the transport portions 16A, 16C which are located adjacently downstream of the non-transport portion 17 (17A, 17B) in the transport direction T. The residing waste toner 80*z* is transported by being gradually pushed by the transport blade 15*b* of the transport portions 16B, 16A which are located adjacently upstream of the non-transport portion 17 (17A, 17B) in the transport direction T.

The residing waste toner 80*z* is gradually renewed in this manner.

In the cleaning device 1, as illustrated in FIG. 3, the non-transport portion 17 (17A, 17B) of the auger 15A is provided at the two positions P1, P2, respectively, in a range to include and face the two end portions 12_j_, 12_k_, respectively, of the cleaning member 12 in the longitudinal direction E. The two positions P1, P2 are the first position P1 and the second position P2 described above.

Therefore, as illustrated in FIG. 6, the part 80_y_ of the waste toner 80_z_ residing at the non-transport portion 17 (17A, 17B) is supplied to be present in the vicinity of the two end portions 12_j_, 12_k_ of the cleaning member 12 in the cleaning device 1. Accordingly, the presence of the external additive 81 (see FIG. 3B) attached to the part 80_y_ of the waste toner 80_z_ is also secured in the vicinity of the two end portions 12_j_, 12_k_ of the cleaning member 12.

In the cleaning device 1, as illustrated in FIG. 3, the auger 15A includes the transport portions 16A, 16B, 16C provided at positions upstream and downstream of the non-transport portions 17A, 17B in the transport direction T so as to interpose the non-transport portions 17A, 17B.

Therefore, in the cleaning device 1, transport of waste toner by the transport portion 16 is secured at positions adjacently upstream and downstream of the non-transport portions 17A, 17B of the auger 15A in the transport direction T.

In the cleaning device 1, as illustrated in FIG. 1, the auger 15A is disposed such that the lower end 16_d_ of the transport blade 15_b_, which is an example of the transport portion 16, is located at the height position h1 below the upper end 13_t_ of the rising portion 13_b_ of the holding member 13.

Therefore, in the cleaning device 1, waste toner deposited above the upper end 13_t_ of the rising portion 13_b_ of the holding member 13 in the storage space 10_s_ of the body 10 is stirred and agitated by rotational operation (transport operation) of the auger 15A at all times, in order not to be aggregated or further solidified.

Image Forming Apparatus

Figure 7:
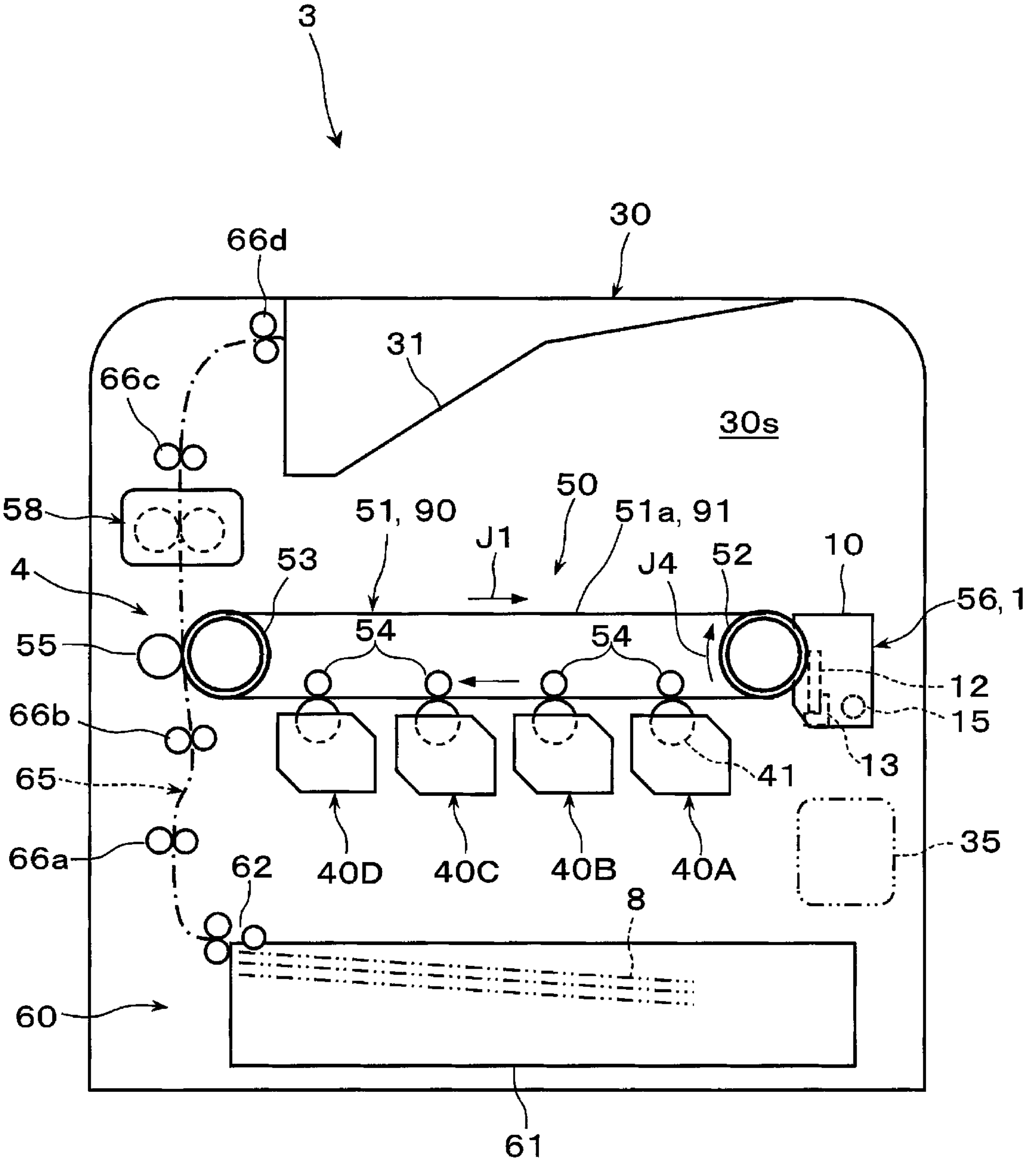
FIG. 7 illustrates an overview of an image forming apparatus according to the first exemplary embodiment.

The image forming apparatus 3 according to the first exemplary embodiment is a device that forms an image composed of the toner 80, and includes a housing 30, an image forming portion 4 disposed inside the housing 30, the cleaning device 1 described above, etc., as illustrated in FIG. 7.

The housing 30 includes an internal storage space 30_s_ in which the image forming portion 4, the cleaning device 1, etc. are stored and disposed, an ejection storage portion 31 that stores a recording medium 8 on which an image has been formed and which has been ejected thereto, etc. The ejection storage portion 31 is provided as a slope recessed obliquely at the upper surface portion of the housing 30. The housing 30 is formed in a box shape using materials such as a structural frame and exterior materials.

The image forming portion 4 is a portion that forms an image composed of the toner 80 on the recording medium 8.

The image forming portion 4 according to the first exemplary embodiment is constituted from an imaging unit 40 that forms a toner image composed of the toner 80, an intermediate transfer unit 50 that relays and transfers the toner image formed by the imaging unit 40 to the recording medium 8, a fixing device 58 that fixes the toner image transferred to the recording medium 8 to the recording medium 8, and a medium supply unit 60 that stores and supplies the recording medium 8.

The imaging unit 40 is constituted from four imaging units 40A, 40B, 40C, 40D that exclusively form toner images in four colors (yellow, magenta, cyan, black) composed of toner in such colors, for example.

The four imaging units 40A, 40B, 40C, 40D are disposed in line in the storage space 30_s_ of the housing 30.

While the imaging units 40A, 40B, 40C, 40D use toner in the four different colors mentioned above, the imaging units 40A, 40B, 40C, 40D are otherwise configured substantially in the same manner.

Figure 8:
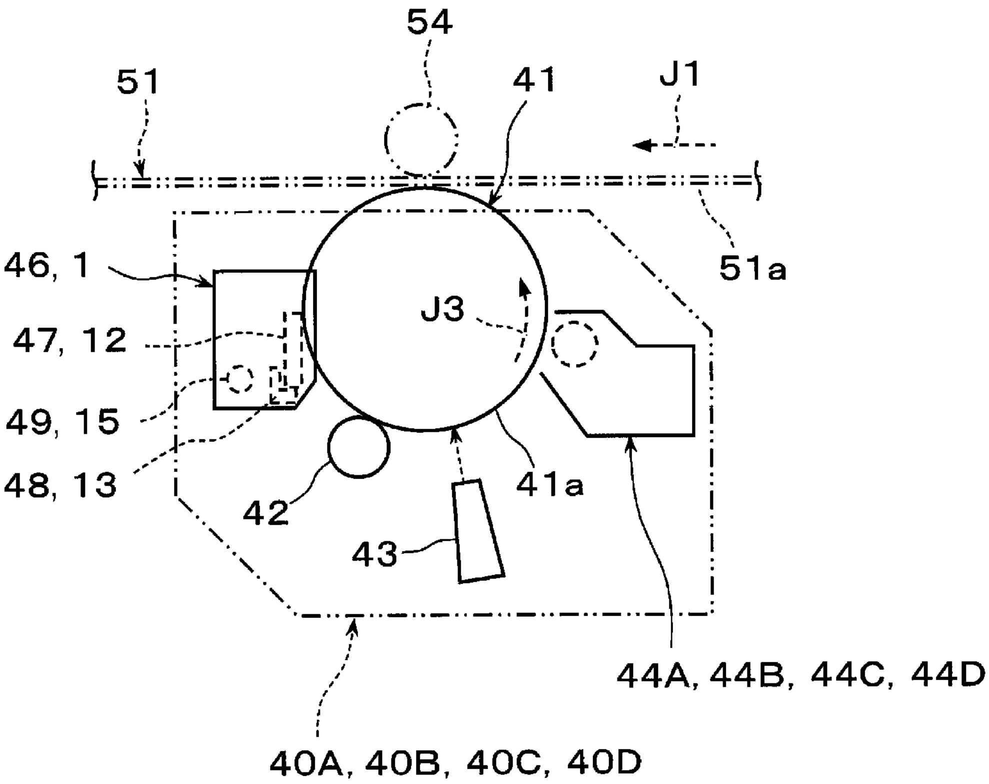
FIG. 8 illustrates an overview of an imaging unit of the image forming apparatus in FIG. 7.

That is, as illustrated in FIG. 8, the imaging units 40A, 40B, 40C, 40D include a drum-shaped photoconductor 41 as an example of an image holding member, and devices such as a charging device 42, a latent image forming device (image exposure device) 43, a developing device 44A, 44B, 44C, 44D, and a cleaning device 46 disposed around the photoconductor 41.

The photoconductor 41 is an image holding member that includes an image holding surface 41_a_ that includes a photosensitive layer and holds a toner image, and is rotated in a direction (rotational direction J3) indicated by the arrow.

The latent image forming device 43 is a device that forms an electrostatic latent image by exposing the image holding surface 41_a_ that has been charged by the photoconductor 41 to light on the basis of image information. The latent image forming device 43 operates upon receiving an image signal generated when image information input from the outside is subjected to a prescribed process performed by an image processing unit (not illustrated) etc.

The developing device 44A, 44B, 44C, 44D exclusively uses toner in one of the four colors mentioned above. The toner may be a two-part developer containing a toner and a carrier, for example.

The cleaning device 46 includes a cleaning member 47 that cleans the image holding surface 41_a_ by contacting the image holding surface 41_a_ of the photoconductor 41 having passed through a first transfer position and scraping toner, a holding member 48 that holds the cleaning member 47, a transport member 49 that transports waste toner, etc. The cleaning member 47, the holding member 48, and the transport member 49 are disposed inside a body.

The intermediate transfer unit 50 is constituted by disposing devices such as an intermediate transfer body 51 in the shape of an endless belt, support rollers 52, 53 that rotatably support the intermediate transfer body 51, first transfer rollers 54, a second transfer roller 55, and a cleaning device 56.

The intermediate transfer body 51 is an endless belt that includes an image holding surface 51_a_ that holds toner images in various colors formed by the imaging units 40A, 40B, 40C, 40D. The intermediate transfer body 51 is rotated by the support roller 52, which is rotated in a direction (rotational direction J4) indicated by the arrow, so as to be moved cyclically in the moving direction J1 indicated by the arrow.

The first transfer rollers 54 are each a transfer device that is rotated while pressing the intermediate transfer body 51 against the photoconductor 41 of the imaging unit 40A, 40B, 40C, 40D at a position (first transfer position) at which the intermediate transfer body 51 faces the photoconductor 41. The first transfer rollers 54 perform a first transfer in which the toner image formed on the photoconductor 41 is transferred to the image holding surface 51_a_ of the intermediate transfer body 51.

The second transfer roller 55 is a transfer device that is rotated while pressing the intermediate transfer body 51 against the support roller 53 at a position (second transfer position) at which the intermediate transfer body 51 faces the support roller 53. The second transfer roller 55 performs a second transfer in which the toner images that have been transferred to the intermediate transfer body 51 through the first transfer are collectively transferred to the recording medium 8.

The cleaning device 56 is a device that cleans the image holding surface 51*a* by contacting the image holding surface (specifically, belt outer peripheral surface) 51*a* of the belt-shaped intermediate transfer body 51 that has passed through the second transfer position and scraping toner.

As illustrated in FIG. 7, the cleaning device 56 may be the cleaning device 1 discussed above (see FIGS. 1 to 3 etc.).

Therefore, in the image forming apparatus 3, the belt-shaped intermediate transfer body 51 to be cleaned by the cleaning device 56 which is composed of the cleaning device 1 corresponds to the cleaning target body 90, and the image holding surface (specifically, belt outer peripheral surface) 51*a* of the intermediate transfer body 51 corresponds to the cleaning target surface 91.

The cleaning device 56 includes the body 10, the cleaning member 12, the holding member 13, the transport member 15 (auger 15A), etc., as with the cleaning device 1. In the cleaning device 56, as illustrated in FIGS. 1 and 7, the cleaning member 12 is disposed so as to contact a portion of the intermediate transfer body 51 wound around the support roller 52.

In the cleaning device 56, the cleaning member 12 is disposed so as to contact a portion of the image holding surface 51*a* of the intermediate transfer body 51 wound around the support roller 52.

In the image forming apparatus 3, as indicated by the double-dashed line in FIG. 3, an effective image holding region 96 is located (or set) on the image holding surface 51*a* of the intermediate transfer body 51. The effective image holding region 96 on the intermediate transfer body 51 is a region in which an image (specifically, a toner image to be transferred) that constitutes an image composed of toner may be held. In this event, regions (non-image forming areas) 97A, 97B are located on the outer side of the effective image holding region 96 on the image holding surface 51*a* of the intermediate transfer body 51.

In the cleaning device 1 in this case, as illustrated in FIG. 3, the non-transport portions 17A, 17B of the auger 15A are provided at the two positions P1, P2, respectively, in a range to face portions (97A, 97B) that extend from the two end portions 12*j*, 12*k*, respectively, of the cleaning member 12 in the longitudinal direction E to end portions 96*c*, 96*d*, respectively, of the effective image holding region 96.

The fixing device 58 is a device that fixes the toner image that has been transferred through the second transfer at the second transfer position of the intermediate transfer unit 50 to the recording medium 8.

The fixing device 58 is constituted by disposing devices such as a heating rotary member and a pressurizing rotary member in the internal space of a housing provided with an introduction port and an ejection port for the recording medium 8. A portion of the fixing device 58 at which the heating rotary member and the pressurizing rotary member are in press contact with each other serves as a fixing nip part at which a fixing process is performed.

The medium supply unit 60 is a device that stores and feeds recording media 8 of a prescribed size to be supplied to the second transfer position of the intermediate transfer unit 50. The medium supply unit 60 is constituted by disposing devices such as a storage body 61 that stores the recording media 8 and a feed device 62 that feeds the recording media 8, one medium at a time.

The recording media 8 may be any medium such as regular paper, coated paper, cardboard, and envelopes that may be stored and transported inside the housing 30 and that enable transfer and fixation of toner images, and the material, form, etc. of the recording media 8 are not specifically limited.

The dot-and-dash line denoted by reference sign 65 in FIG. 7 indicates a principal transport path through which the recording medium 8 is transported inside the housing 30. The transport path is constituted by disposing a plurality of transport rollers 66*a*, 66*b*, 66*c*, 66*d* that hold and transport the recording medium 8, a plurality of guide members (not illustrated) that secure a space for transport of the recording medium 8 and guide the recording medium 8 being transported, etc.

Operation of the image forming apparatus 3 to form a multi-color image is performed as follows, for example.

The multi-color image to be formed in the following description is a so-called full-color image constituted by combining toner in four colors including yellow, magenta, cyan, and black.

In the image forming apparatus 3, first, the imaging units 40A, 40B, 40C, 40D and the intermediate transfer unit 50 of the image forming portion 4 execute charging operation, exposure operation, developing operation, transfer operation, cleaning operation, etc. when a control unit (not illustrated) receives an instruction for operation to form an image. In the image forming apparatus, 3, meanwhile, the medium supply unit 60 of the image forming portion 4 executes operation to supply the recording medium 8 to the second transfer position.

Consequently, in the image forming apparatus 3, toner images in predetermined colors are formed on the respective drum-shaped photoconductors 41 of the imaging units 40A, 40B, 40C, 40D. In the image forming apparatus 3, the toner images in the respective colors are transferred to the belt-shaped intermediate transfer body 51 of the intermediate transfer unit 50 through a first transfer, and thereafter transferred to the recording medium 8 supplied to the second transfer position by way of the transport path 65 through a second transfer.

In the image forming apparatus 3, subsequently, fixing operation in which the recording medium 8 to which the toner images have been transferred through the second transfer is introduced to pass through the fixing nip part at which the heating rotary member and the pressurizing rotary member contact each other is executed in the fixing device 58.

Consequently, in the image forming apparatus 3, unfixed toner images are heated under pressurization to be fixed to the recording medium 8. The recording medium 8 after the fixation is ejected to the ejection storage portion 31 by way of the transport path 65 to be stored.

Basic operation of the image forming apparatus 3 to form a multi-color image on one surface of a single recording medium 8 is completed through the operation described above.

In the image forming apparatus 3, the image holding surface 51*a*, which is the cleaning target surface 91, of the belt-shaped intermediate transfer body 51 of the intermediate transfer unit 50 is cleaned by the cleaning device 56, which is composed of the cleaning device 1 (see FIGS. 6 and 7).

In the cleaning device 1, cleaning is performed with the part 12*m* (a portion that is close to the corner portion 12*c*) of the distal end surface 12*a* of the cleaning member 12 kept in contact with the image holding surface 51*a* of the intermediate transfer body 51 being moved, as discussed above (see FIG. 4).

In the cleaning device 1, during the cleaning, waste toner resides in the storage space 10$s$ of the body 10 in ranges corresponding to the non-transport portions 17A, 17B of the auger 15A, and the part 80$y$ of the residing waste toner 80$z$ is supplied to be present in the vicinity of the two end portions of the distal end surface 12$a$ of the cleaning member 12 in the longitudinal direction E, as discussed above (see FIGS. 5 and 6).

Removable Unit

Figure 9A:
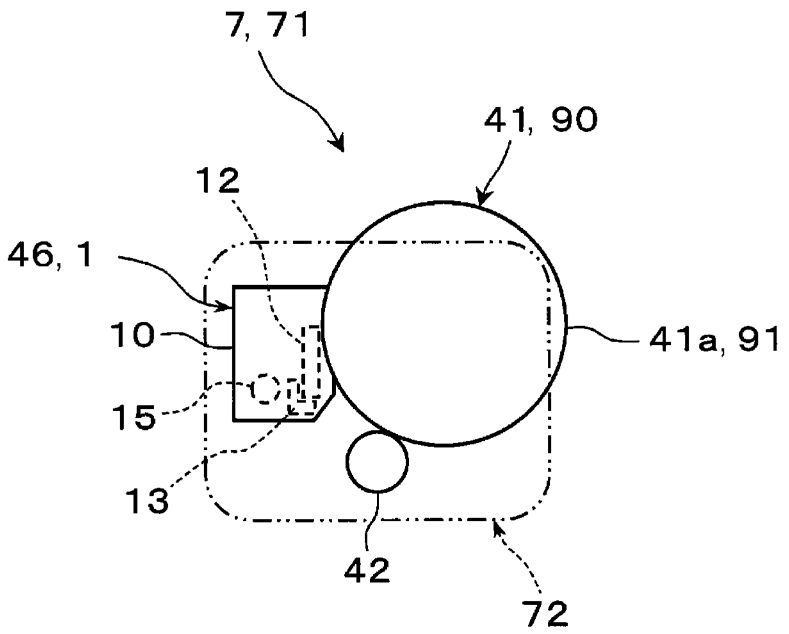
FIG. 9A illustrates an overview of an example of a removable unit that includes the cleaning device.

The removable unit 7 according to the first exemplary embodiment is constituted as a removable process unit 71 in which a portion of the imaging unit 40A, 40B, 40C, 40D of the image forming apparatus 3 is removably mounted to the housing 30 and finally to the imaging unit 40 as illustrated in FIG. 9A, for example.

The removable process unit 71 according to the first exemplary embodiment is constituted as a unit (or a cartridge) in which the drum-shaped photoconductor 41, the charging device 42, and the cleaning device 46 are integrally attached to a support frame 72.

In the removable process unit 71, as illustrated in FIG. 9A, the cleaning device 1 discussed above (see FIGS. 1 to 3 etc.) is used as the cleaning device 46 for the drum-shaped photoconductor 41.

Therefore, in the removable process unit 71, the drum-shaped photoconductor 41 corresponds to the cleaning target body 90 to be cleaned by the cleaning device 46 which is composed of the cleaning device 1, and the image holding surface (specifically, drum outer peripheral surface) 41$a$ of the photoconductor 41 corresponds to the cleaning target surface 91.

As illustrated in FIG. 9A, the cleaning device 46 includes the body 10, the cleaning member 12, the holding member 13, the transport member 15, etc., as with the cleaning device 1. In the cleaning device 46, the cleaning member 12 is disposed so as to contact a portion of the image holding surface 41$a$ of the photoconductor 41 after transfer operation and before charging operation.

Figure 10:
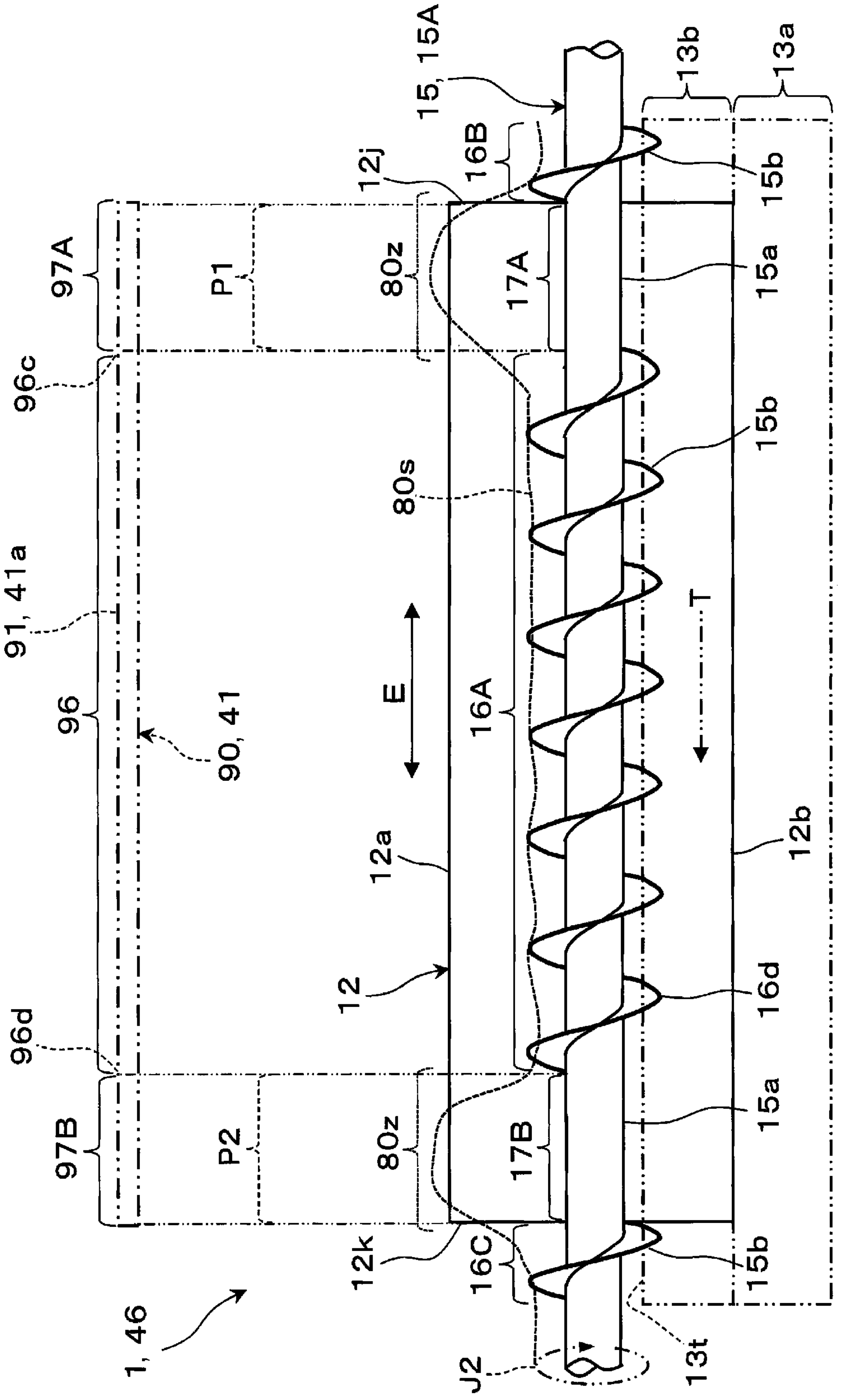
FIG. 10 illustrates the configuration of a transport member etc. of the cleaning device in the removable unit in FIG. 9A.

In the removable process unit 71, as conceptually indicated by the double-dashed line in FIG. 10, the effective image holding region 96 is located (or set) on the image holding surface 41$a$ of the photoconductor 41. The effective image holding region 96 on the photoconductor 41 is a region in which an image (specifically, a toner image to be developed, or a latent image) that constitutes an image composed of toner may be held. Also in this event, regions (non-image forming areas) 97A, 97B are located on the outer side of the effective image holding region 96 on the image holding surface 41$a$ of the photoconductor 41.

In the cleaning device 1 for the image holding surface 41$a$ of the photoconductor 41, as illustrated in FIG. 10, the non-transport portions 17A, 17B of the auger 15A are provided at the two positions P1, P2, respectively, in a range to face portions (97A, 97B) that extend from the two end portions 12$j$, 12$k$, respectively, of the cleaning member 12 in the longitudinal direction E to the end portions 96$c$, 96$d$, respectively, of the effective image holding region 96.

The removable process unit 71 is constituted such that the removable process unit 71 alone is drawn forward of the housing 30 of the image forming apparatus 3 to be removed, or such that the removable process unit 71 is removed after a part of the corresponding imaging unit 40 is drawn forward of the housing 30, for example.

In the removable process unit 71 as an example of the removable unit 7 including the cleaning device 1, cleaning is performed with the part 12$m$ (a portion that is close to the corner portion 12$c$) of the distal end surface 12$a$ of the cleaning member 12 contacting the image holding surface 41$a$ of the photoconductor 41, as discussed above (see FIG. 4).

Also in the cleaning device 1, during the cleaning, as indicated by the broken line in FIG. 10, waste toner resides in the storage space 10$s$ of the body 10 in ranges corresponding to the non-transport portions 17A, 17B of the auger 15A, and a part of the residing waste toner 80$z$ is supplied to be present in the vicinity of the two end portions of the distal end surface 12$a$ of the cleaning member 12, as discussed above.

(Modifications of Removable Unit)

It is only necessary that the removable process unit 71 should include at least the cleaning device 1 and the cleaning target body 90 to be cleaned by the cleaning device 1.

Therefore, the removable process unit 71 may not include the charging device 42. The removable process unit 71 may include the latent image forming device 43 or the developing device 44, in addition to the cleaning device 1 and the photoconductor 41 as the cleaning target body 90.

Figure 9B:
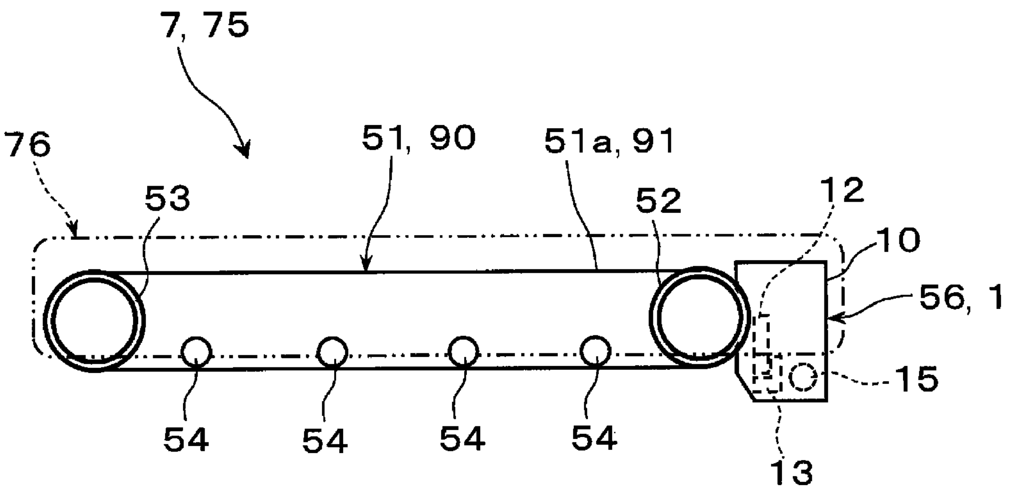
FIG. 9B illustrates an overview of another example of the removable unit that includes the cleaning device.

The removable unit 7 is constituted as a removable transfer unit 75 in which a portion of the intermediate transfer unit 50 of the image forming apparatus 3 is removably mounted to the housing 30 (and finally to the intermediate transfer unit 50), as illustrated in FIG. 9B.

The removable transfer unit 75 according to the first exemplary embodiment is constituted as a unit (or a cartridge) in which the belt-shaped intermediate transfer body 51, the support rollers 52, 53, the first transfer rollers 54, and the cleaning device 56 are integrally attached to a support frame 76.

In the removable transfer unit 75, the cleaning device 1 discussed above is used as the cleaning device 56 for the belt-shaped intermediate transfer body 51.

Therefore, in the removable transfer unit 75, the belt-shaped intermediate transfer body 51 corresponds to the cleaning target body 90 to be cleaned by the cleaning device 1, and the image holding surface (specifically, belt outer peripheral surface) 51$a$ of the intermediate transfer body 51 corresponds to the cleaning target surface 91. The cleaning device 56 includes the body 10 which includes the storage space 10$s$, the cleaning opening portion 11, etc., and the cleaning member 12, the holding member 13, the transport member 15, etc. which are disposed inside the body 10 (see FIGS. 1 to 3 etc.), as with the cleaning device 1.

The removable transfer unit 75 is constituted such that the removable transfer unit 75 alone is drawn forward of the housing 30 of the image forming apparatus 3 to be removed, or such that the removable transfer unit 75 is removed after a part or all of the intermediate transfer unit 50 is drawn forward of the housing 30, for example.

In the removable transfer unit 75 as another example of the removable unit 7 including the cleaning device 1, cleaning is performed with the part 12$m$ (a portion that is close to the corner portion 12$c$) of the distal end surface 12$a$ of the cleaning member 12 contacting the image holding surface 41$a$ of the intermediate transfer body 51, as discussed above (see FIG. 4).

In the cleaning device 1, during the cleaning, as indicated by the broken line in FIGS. 5 and 6, waste toner resides in the storage space 10$s$ of the body 10 in ranges corresponding to the non-transport portions 17A, 17B of the auger 15A, and a part of the residing waste toner 80$z$ is supplied to be present in the vicinity of the two end portions of the distal end surface 12$a$ of the cleaning member 12, as discussed above.

It is only necessary that the removable transfer unit 75 should include at least the cleaning device 1 and the cleaning target body 90 to be cleaned by the cleaning device 1.

Therefore, the removable transfer unit 75 may not include the first transfer rollers 54. The removable transfer unit 75 may include the second transfer roller 55.

Second Exemplary Embodiment

Figure 11:
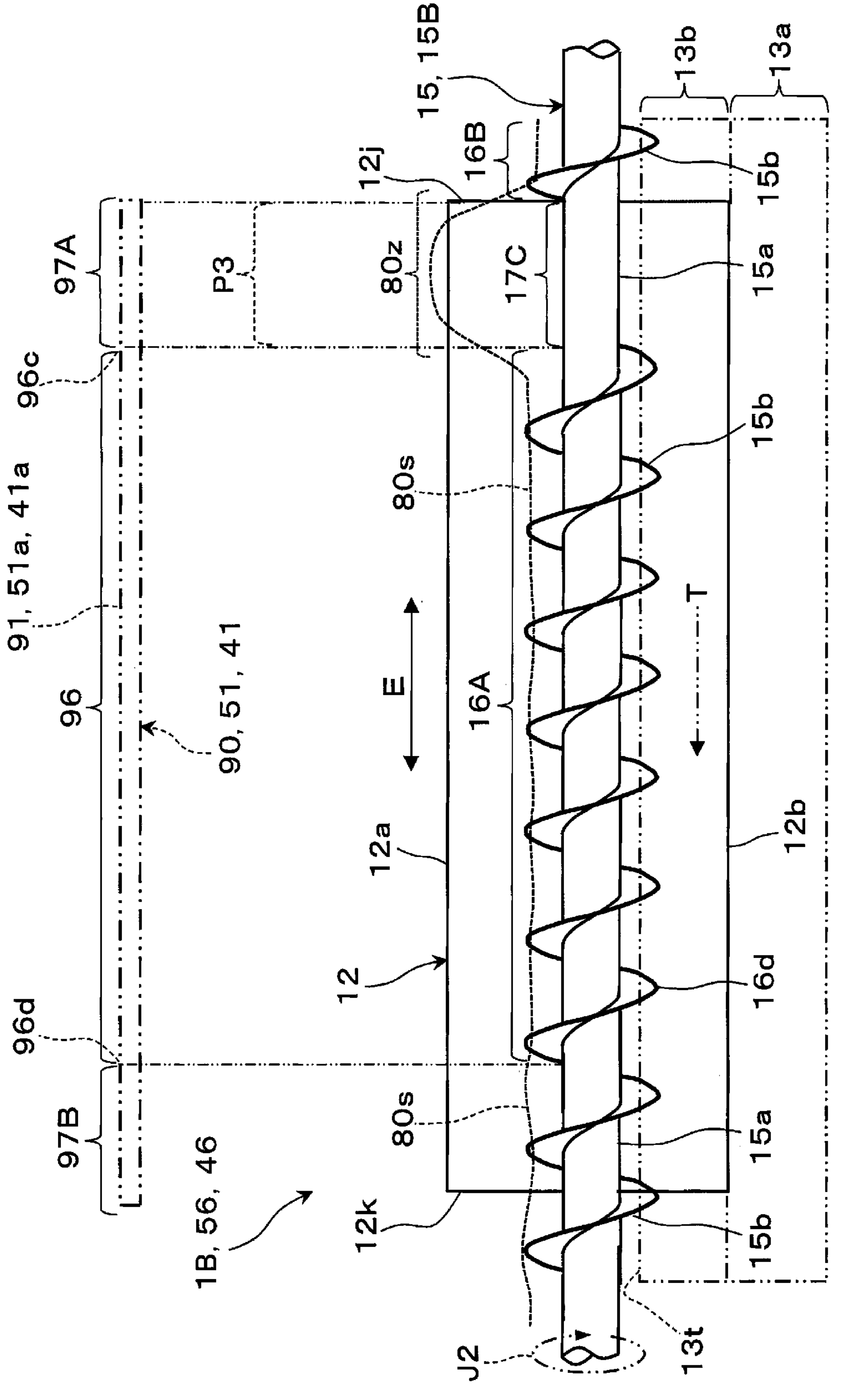
FIG. 11 illustrates a part (configuration of a transport member etc.) of a cleaning device according to a second exemplary embodiment.

FIG. 11 illustrates a part (components such as a transport member) of a cleaning device 1B according to a second exemplary embodiment.

The cleaning device 1B according to the second exemplary embodiment is configured in the same manner as the cleaning device 1 according to the first exemplary embodiment except that the auger 15A according to the first exemplary embodiment is replaced with an auger 15B configured differently.

Here, the cleaning target body 90 to be cleaned by the cleaning device 1B is defined as the intermediate transfer body 51 or the photoconductor 41, and the image holding surface 51*a* of the intermediate transfer body 51 or the image holding surface 41*a* of the photoconductor 41 is defined as the cleaning target surface 91, by way of example.

In the auger 15B according to the first exemplary embodiment, as illustrated in FIG. 11, one non-transport portion 17C is provided at one position P3 in a range to include and face one end portion 12*j* of the two end portions 12*j*, 12*k* of the cleaning member 12 in the longitudinal direction E. The auger 15B is configured differently from the auger 15A according to the first exemplary embodiment in adopting the non-transport portion 17C.

The one position P3 is a position in a prescribed range to include the end portion 12*j* of the cleaning member 12 on the upstream side in the transport direction T. Specifically, as illustrated in FIG. 11, the one position P3 is a position in a range from the end portion 12*j* of the cleaning member 12 to a position a predetermined distance on the downstream side in the transport direction T.

In the case where the effective image holding region 96 is located on the cleaning target surface 91 such as the image holding surface 51*a*, as illustrated in FIG. 11, the one position P3 according to the second exemplary embodiment is a position in a range to face a portion (97A) that extends from the end portion 12*j* of the cleaning member 12 to the end portion 96*c* of the effective image holding region 96.

The cleaning device 1B uses the auger 15B, which includes the non-transport portion 17C, and therefore a part of waste toner stored in the storage space 10*s* of the body 10 is not transported at the non-transport portion 17C but temporarily resides in the storage space 10*s* (residing waste toner 80*z*) during cleaning, as indicated by the broken line in FIG. 11.

In the cleaning device 1B, the part 80*y* of the residing waste toner 80*z* is deposited and supplied so as to be returned to the vicinity of the one end portion 12*j* of the distal end surface 12*a* of the cleaning member 12, and the part 80*y* is placed on the distal end surface 12*a* as the upper end of the cleaning member 12 (see FIG. 6). The part 80*y* of waste toner supplied to be placed on the distal end surface 12*a* of the cleaning member 12 is spread little by little in the longitudinal direction E of the cleaning member 12 (principally downstream in the transport direction T in the present example).

The amount of the waste toner 80*z* residing at the non-transport portion 17C of the auger 15B does not keep increasing, and the waste toner 80*z* is transported by being sequentially scraped by the transport blade 15*b* of the transport portion 16A which is located adjacently downstream of the non-transport portion 17C in the transport direction T. The residing waste toner 80*z* is transported by being gradually pushed by the transport blade 15*b* of the transport portion 16B which is located adjacently upstream of the non-transport portion 17C in the transport direction T.

The residing waste toner 80*z* is gradually renewed in this manner.

Other Modifications

While exemplary embodiments of the present disclosure have been described above, the present disclosure is not limited to the configurations described in relation to the exemplary embodiments described above, and a variety of modifications and implementations may be made without departing from the scope and spirit of the present disclosure.

Therefore, the present disclosure may also include the following modifications etc., for example.

While a transport member provided with one or two non-transport portions 17 is indicated as an example of the transport member 15 having the non-transport portion 17 in the first and second exemplary embodiments, a transport member provided with three or more non-transport portions 17 may also be used.

The transport blade 15*b* of the auger 15A, 15B according to the first and second exemplary embodiments may have different pitches in a single transport member 16 or between a plurality of transport members 16. The widths (lengths along the transport direction T) of the two non-transport portions 17A, 17B of the auger 15A may be different from each other.

While the auger 15A, 15B composed of the rotary shaft 15*a* and the transport blade 15*b* is indicated as an example of the transport member 15 having the non-transport portion 17 in the first and second exemplary embodiments, the transport member 15 is not limited thereto.

Figure 12:
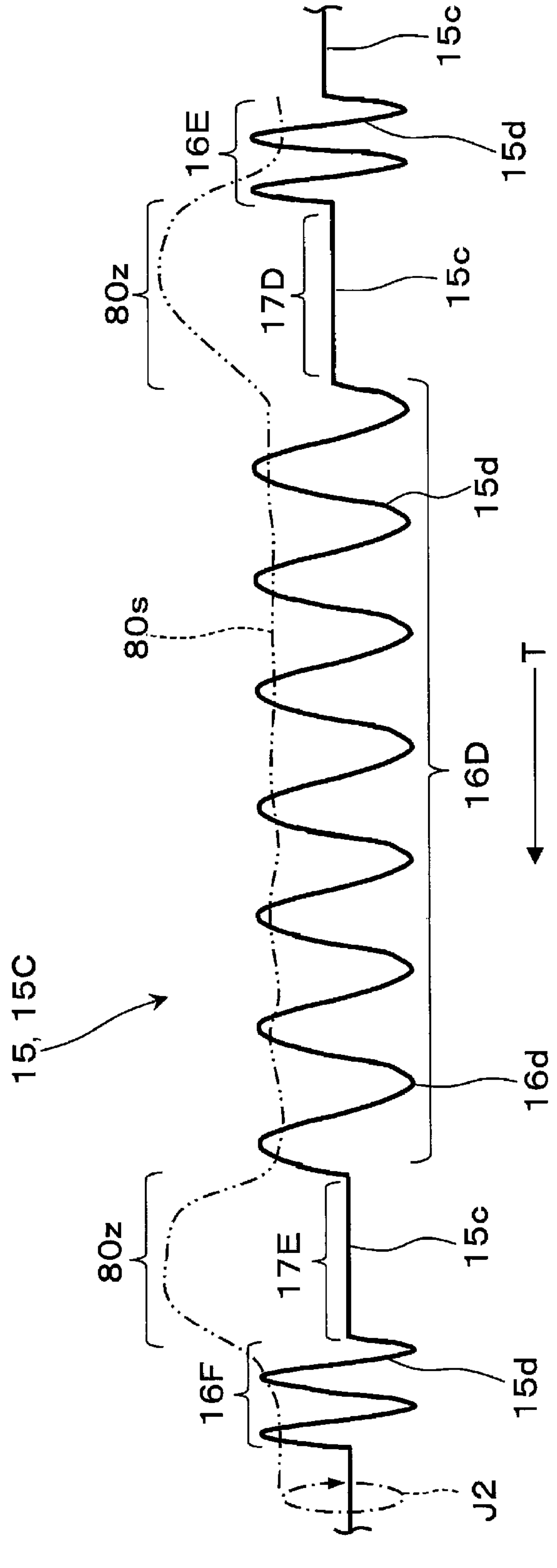
FIG. 12 illustrates another example of a transport member that includes a non-transport portion.

As illustrated in FIG. 12, for example, a transport member 15 having a non-transport portion 17 and formed differently may be an agitator 15C formed to include a shaft portion 15*c* composed of a linear wire material and a bent transport portion 15*d* composed of a wire material bent spirally.

The agitator 15C illustrated in FIG. 12 is provided with non-transport portions 17D, 17E at positions (P1, P2), as with the non-transport portions 17A, 17B of the auger 15A according to the first exemplary embodiment. The non-transport portions 17D, 17E are constituted as a portion not provided with the bent transport portion 15*d* but composed of only the shaft portion 15*c*.

The agitator 15C includes a transport portion 16D located between the non-transport portions 17D, 17E, a transport portion 16E located upstream of the non-transport portion 17D in the transport direction T, and a transport portion 16F located downstream of the non-transport portion 17E in the transport direction T. In the agitator 15C, the spiral pitch of the transport portion 16E and the transport portion 16F is less than the spiral pitch of the transport portion 16D. However, the spiral pitches are not limited thereto.

The agitator 15C is installed in the storage space 10*s* of the body 10 of the cleaning device 1 (see FIG. 6), and rotated in the prescribed direction (rotational direction) J2 about the shaft 15*c* during cleaning.

Consequently, when the agitator 15C is rotated in the rotational direction J2 about the shaft portion 15*c* in the cleaning device 1 including the agitator 15C, as illustrated in FIG. 12, waste toner (80*s*) is transported in the transport direction T by the transport portions 16D, 16E, 16F in the storage space 10*s*, and a part of the waste toner is caused to temporarily reside (residing waste toner 80*z*) in ranges corresponding to the non-transport portions 17D, 17E.

As a result, a part (80*y*) of the residing waste toner 80*z* may be supplied so as to be placed on the distal end surface 12*a* of the cleaning member 12 also by the agitator 15C (see FIG. 6).

In the auger 15B including the one non-transport portion 17C according to the second exemplary embodiment, the non-transport portion 17C is provided at the one position P3 in a range to include and face the end portion 12*j* of the cleaning member 12 on one side in the longitudinal direction E (upstream side in the transport direction T).

However, the one non-transport portion 17C may be provided at one position (e.g. the position P2 in FIG. 3) in a range to include and face the end portion 12*k* of the cleaning member 12 on the other side in the longitudinal direction E (downstream side in the transport direction T).

The agitator 15C described above may also be provided with only one of the non-transport portions 17D, 17E.

In the image forming apparatus 3, the cleaning device 1 may be used as the cleaning device 46 (cleaning device 46 not included as a part of a removable unit) of the imaging unit 40A, 40B, 40C, 40D, as illustrated in FIG. 8.

In the image forming apparatus 3, the cleaning target body 90 to be cleaned by the cleaning device 1 may be a constituent component other than the intermediate transfer body 51 (including one of a drum type) or the photoconductor 41 (including one of a belt type).

The image forming apparatus according to the present disclosure is not limited to the image forming apparatus 3 that forms a multi-color image indicated in relation to the first exemplary embodiment. That is, the image forming apparatus may be an image forming apparatus of any other type that forms a multi-color image, or an image forming apparatus of a type that forms a single-color image, as long as the image forming apparatus includes the cleaning device 1.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

A cleaning device comprising:

a plate-like cleaning member that cleans a cleaning target surface, which is moved with toner attached thereto, of a cleaning target body by scraping the toner with a part of a distal end surface of the cleaning member contacting the cleaning target surface;

a body that has a storage space that stores waste toner that has fallen after being scraped by the cleaning member; and a transport member disposed in the storage space of the body at a position below the distal end surface of the cleaning member to transport the waste toner stored in the storage space along a longitudinal direction of the cleaning member, wherein the transport member includes a non-transport portion that exerts no transport force in a direction along the longitudinal direction of the cleaning member.

(((2)))

The cleaning device according to (((1))), wherein the non-transport portion is provided at one position in a range to include and face an end portion of the cleaning member on an upstream side in a transport direction, of two end portions of the cleaning member in the longitudinal direction.

(((3)))

The cleaning device according to (((2))), wherein the non-transport portion is provided at one position in a range from the upstream end portion of the cleaning member to a position on a downstream side in the transport direction.

(((4)))

The cleaning device according to (((1))), wherein the non-transport portion is provided at two positions in a range to respectively include and face two end portions of the cleaning member in the longitudinal direction.

(((5)))

The cleaning device according to (((4))), wherein the non-transport portion is provided at two positions including a first position in a range from an end portion on an upstream side in a transport direction, of the two end portions of the cleaning member, to a position on a downstream side in the transport direction, and a second position in a range from an end portion on a downstream side in the transport direction to a position on an upstream side in the transport direction.

(((6)))

The cleaning device according to any one of (((1))) to (((5))), wherein the transport member includes transport portions provided at positions upstream and downstream of the non-transport portion in a transport direction so as to interpose the non-transport portion, the transport portion exerting a transport force in a direction along the longitudinal direction of the cleaning member.

(((7)))

The cleaning device according to (((6))), further comprising:

a holding member that holds a rear end portion of the cleaning member, wherein the transport member is disposed such that a lowermost end of the transport portion is located below an upper end of a portion of the holding member that holds the cleaning member.

(((8)))

The cleaning device according to any one of (((1))) to (((7))), wherein the transport member is an auger including a rotary shaft disposed along the longitudinal direction of the cleaning member, and a transport blade provided so as to be spirally wound around the rotary shaft, and the non-transport portion is a portion of the auger at which the transport blade is discontinuous and not provided.

(((9)))

A removable unit comprising:

a cleaning target body that includes a cleaning target surface that is moved with toner attached thereto; and the cleaning device according to any one of (((1))) to (((8))), wherein the removable unit is removably mountable to an image forming apparatus that forms an image composed of toner.

(((10)))

An image forming apparatus comprising:

an image forming portion that forms an image composed of toner on a recording medium; and the cleaning device according to any one of (((1))) to (((8))).

(((11)))

The image forming apparatus according to (((10))), wherein, in a case where an effective image holding region is located on the cleaning target surface, the non-transport portion of the transport member is provided at two positions in a range to respectively face portions from two end portions of the cleaning member in the longitudinal direction to end portions of the effective image holding region.

(((12)))

An image forming apparatus comprising:

an image forming portion that forms an image composed of toner on a recording medium; and the removable unit according to (((9))), which constitutes a part of the image forming portion.

(((13)))

The image forming apparatus according to (((12))), wherein, in a case where an effective image holding region is located on the cleaning target surface in the removable unit, the non-transport portion of the transport member is provided at two positions in a range to respectively face portions from two end portions of the cleaning member in the longitudinal direction to end portions of the effective image holding region.

What is claimed is:

1. A cleaning device comprising:

a plate-like cleaning member that cleans a cleaning target surface, which is moved with toner attached thereto, of a cleaning target body by scraping the toner with a part of a distal end surface of the cleaning member contacting the cleaning target surface;

a body that has a storage space that stores waste toner that has fallen after being scraped by the cleaning member;

a transport member disposed in the storage space of the body at a position below the distal end surface of the cleaning member to transport the waste toner stored in the storage space along a longitudinal direction of the cleaning member, and a holding member that holds a rear end portion of the cleaning member, wherein the transport member includes transport portions and a non-transport portion that exerts no transport force in a direction along the longitudinal direction of the cleaning member, wherein the transport member transports waste toner to be fed to the outside of the body, and wherein the transport member is disposed such that a lowermost end of the transport portions is located above a lower end of a portion of the holding member that holds the cleaning member.

2. The cleaning device according to claim 1, wherein the non-transport portion is provided at one position in a range to include and face an end portion of the cleaning member on an upstream side in a transport direction, of two end portions of the cleaning member in the longitudinal direction.

3. The cleaning device according to claim 2, wherein the non-transport portion is provided at one position in a range from the upstream end portion of the cleaning member to a position on a downstream side in the transport direction.

4. A removable unit comprising:

the cleaning target body that includes the cleaning target surface that is moved with toner attached thereto; and the cleaning device according to claim 3, wherein the removable unit is removably mountable to an image forming apparatus that forms an image composed of toner.

5. A removable unit comprising:

the cleaning target body that includes the cleaning target surface that is moved with toner attached thereto; and the cleaning device according to claim 2, wherein the removable unit is removably mountable to an image forming apparatus that forms an image composed of toner.

6. The cleaning device according to claim 1, wherein the non-transport portion is provided at two positions in a range to respectively include and face two end portions of the cleaning member in the longitudinal direction.

7. The cleaning device according to claim 6, wherein the non-transport portion is provided at two positions including a first position in a range from an end portion on an upstream side in a transport direction, of the two end portions of the cleaning member, to a position on a downstream side in the transport direction, and a second position in a range from an end portion on a downstream side in the transport direction to a position on an upstream side in the transport direction.

8. A removable unit comprising:

the cleaning target body that includes the cleaning target surface that is moved with toner attached thereto; and the cleaning device according to claim 7, wherein the removable unit is removably mountable to an image forming apparatus that forms an image composed of toner.

9. A removable unit comprising:

the cleaning target body that includes the cleaning target surface that is moved with toner attached thereto; and the cleaning device according to claim 6, wherein the removable unit is removably mountable to an image forming apparatus that forms an image composed of toner.

10. The cleaning device according to claim 1, wherein the transport portions are provided at positions upstream and downstream of the non-transport portion in a transport direction so as to interpose the non-transport portion, the transport portions exerting a transport force in a direction along the longitudinal direction of the cleaning member.

11. The cleaning device according to claim 10, wherein the transport member is disposed such that a lowermost end of the transport portions is located below an upper end of the portion of the holding member that holds the cleaning member.

12. A removable unit comprising:

the cleaning target body that includes the cleaning target surface that is moved with toner attached thereto; and the cleaning device according to claim 11, wherein the removable unit is removably mountable to an image forming apparatus that forms an image composed of toner.

13. A removable unit comprising:

the cleaning target body that includes the cleaning target surface that is moved with toner attached thereto; and the cleaning device according to claim 10, wherein the removable unit is removably mountable to an image forming apparatus that forms an image composed of toner.

14. The cleaning device according to claim 1, wherein the transport member is an auger including a rotary shaft disposed along the longitudinal direction of the cleaning member, and a transport blade provided so as to be spirally wound around the rotary shaft, and the non-transport portion is a portion of the auger at which the transport blade is discontinuous and not provided.

15. A removable unit comprising:

the cleaning target body that includes the cleaning target surface that is moved with toner attached thereto; and the cleaning device according to claim 14, wherein the removable unit is removably mountable to an image forming apparatus that forms an image composed of toner.

16. A removable unit comprising:

the cleaning target body that includes the cleaning target surface that is moved with toner attached thereto; and the cleaning device according to claim 1, wherein the removable unit is removably mountable to an image forming apparatus that forms an image composed of toner.

17. An image forming apparatus comprising:

an image forming portion that forms an image composed of toner on a recording medium; and the removable unit according to claim 16, which constitutes a part of the image forming portion.

18. The image forming apparatus according to claim 17, wherein, in a case where an effective image holding region is located on the cleaning target surface in the removable unit, the non-transport portion of the transport member is provided at two positions in a range to respectively face the two ends of the cleaning member in the longitudinal direction and ends of the effective image holding region.

19. An image forming apparatus comprising:

an image forming portion that forms an image composed of toner on a recording medium; and the cleaning device according to claim 1.

20. The image forming apparatus according to claim 19, wherein, in a case where an effective image holding region is located on the cleaning target surface, the non-transport portion of the transport member is provided at two positions in a range to respectively face the two ends of the cleaning member in the longitudinal direction and ends of the effective image holding region.

* * * * *